United States Patent

Chen

[11] Patent Number: 5,383,722
[45] Date of Patent: Jan. 24, 1995

[54] DRAWER TYPE CD-ROM STORAGE CABINET

[75] Inventor: Simon Chen, Taichung,

[73] Assignee: Shiang Fu Woodware Co., Ltd., Taichung,

[21] Appl. No.: 175,237

[22] Filed: Dec. 29, 1993

[51] Int. Cl.⁶ .................................................. A47B 81/06
[52] U.S. Cl. ................................. 312/9.55; 312/138.1; 312/334.44; 312/348.3
[58] Field of Search .............. 312/9.55, 9.52, 9.47, 312/9.9, 138.1, 330.1, 334.44, 348.3

[56] References Cited

U.S. PATENT DOCUMENTS

| | | | |
|---|---|---|---|
| 3,338,651 | 8/1967 | Jacobson | 312/330.1 |
| 3,754,806 | 8/1978 | Nakagawa | 312/265.5 |
| 4,411,481 | 10/1983 | Berkman | 312/9.52 |
| 4,657,319 | 4/1987 | Zacky et al. | 312/334.44 |
| 4,850,477 | 7/1989 | Gelardi et al. | 206/387 |
| 4,910,915 | 3/1990 | Sanchez | 312/138.1 |
| 5,086,932 | 2/1992 | Gelardi et al. | 206/387 |

OTHER PUBLICATIONS

Sauder Woodworking; assembly instructions for audio rack; Jun. 18, 1993; steps 1–17 included.

Primary Examiner—Peter R. Brown
Assistant Examiner—Janet M. Wilkens
Attorney, Agent, or Firm—Jacobson, Price, Holman & Stern

[57] ABSTRACT

A drawer type CD-ROM storage cabinet includes a cabinet body having a double-swinging door, and a plurality of CD-ROM racks made to slide in the cabinet body between the side panels and vertical partition boards of the cabinet body, wherein plug pins are inserted in respective holes on the side panels and vertical partition boards to limit the moving range of the CD-ROM racks; each CD-ROM rack consists of an open frame made to slide in respective sliding grooves on the side panels or vertical partition boards of the cabinet body, parallel rods longitudinally spaced within the open frame, a plurality of partition plates equally spaced between the two opposite side rails and the parallel rods and defining a plurality of compartments for keeping a respective CD-ROM, each compartment has a projecting strip transversely disposed between the side rail and parallel rod to support a CD-ROM at the bottom, each partition plate having a top flange projecting outwardly on both sides directions to support a respective CD-ROM in a sloping position.

4 Claims, 2 Drawing Sheets

DRAWER TYPE CD-ROM STORAGE CABINET

BACKGROUND OF THE INVENTION

The present invention relates to a drawer type CD-ROM storage cabinet which includes a plurality of CD-ROM racks made to slide in the cabinet body to hold compact discs in a respective sloping position for easy search.

A normal CD-ROM storage cabinet is simply comprised of a cabinet body divided into a plurality of storage spaces by partition boards, and a plurality of CD-ROM storage boxes respective put into the storage spaces within the cabinet body. Each storage space of the cabinet body has parallel rails for sliding the CD-ROM storage boxes at different elevations. Each CD-ROM storage box has a plurality of CD-ROM loading slots for receiving compact discs. This structure of CD-ROM storage cabinet has drawbacks. One drawback of this structure of CD-ROM storage cabinet is that the parallel rails may be damaged easily during the installation of the CD-ROM storage boxes or when the CD-ROM storage boxes are fully loaded with compact discs and frequently moved in and out of the cabinet body. Another drawback of this structure of CD-ROM storage cabinet is that the arrangement of the CD-ROM loading slots on each CD-ROM storage box makes the user difficult to search a specific compact disc when the box is fully loaded. Still another drawback of this structure of CD-ROM storage cabinet is that the CD-ROM storage boxes may escape out of the cabinet body easily because the cabinet body has no any stop means to limit the moving range of the CD-ROM storage boxes.

SUMMARY OF THE INVENTION

The present invention provides an improved drawer type CD-ROM storage cabinet which eliminates the aforesaid drawbacks. According to the preferred embodiment of the present invention, the drawer type CD-ROM storage cabinet comprises a cabinet body having a double-swinging door, and a plurality of CD-ROM racks made to slide in the cabinet body between the side panels and vertical partition boards of the cabinet body, wherein plug pins are inserted in respective holes on the side panels and vertical partition boards to limit the moving range of the CD-ROM racks; each CD-ROM rack consists of an open frame made to slide in respective sliding grooves on the side panels or vertical partition boards of the cabinet body, parallel rods longitudinally spaced within the open frame, a plurality of partition plates equally spaced between the two opposite side rails and the parallel rods and defining a plurality of compartments for keeping a respective CD-ROM, a plurality of projecting strips respectively projecting into either compartment to support a respective CD-ROM at the bottom, each partition plate having a top flange projecting outwardly on both sides to support a respective CD-ROM in a sloping position. Because of the installation of the plug pins on the side panels and vertical partition boards of the cabinet body, the CD-ROM racks do not escape out of the cabinet body when installed. Because compact discs are respectively received in either compartment of either CD-ROM rack in a respective sloping position by the top flange of either partition plate of the CD-ROM rack, it is easy to search the compact discs.

DETAILED DESCRIPTION OF THE PREFERRED EMBODIMENT

Figure 1:
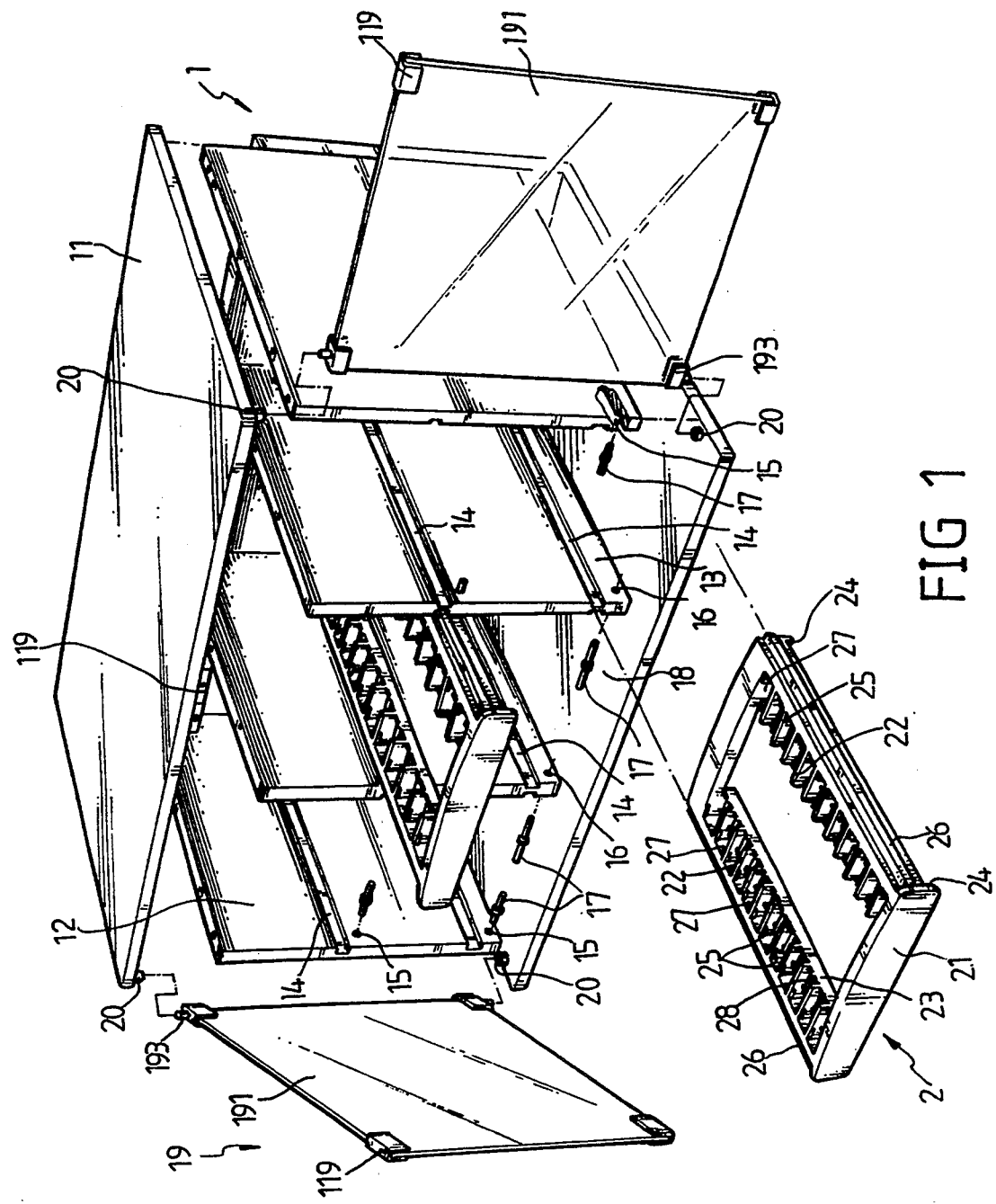
FIG. 1 is an exploded view of a drawer type CD-ROM storage cabinet according to the preferred embodiment of the present invention.

Referring to FIG. 1, a drawer type CD-ROM storage cabinet in accordance with the preferred embodiment of the present invention is generally comprised of a cabinet body 1, and a plurality of CD-ROM racks 2.

The cabinet body 1 is made of rectangular shape comprised of a top panel 11 horizontally disposed at the top, a bottom panel 18 horizontally disposed at the bottom, two opposite side panels 12 vertically connected between the top panel 11 and the bottom panel 18 at two opposite sides, two vertical partition boards 13 spaced between the side panels 12, a back panel (not indicated by any reference number), a double-swinging front door 19 consisted of two transparent door panels 191. Vertically spaced, sliding grooves 14 are respectively made on the inner side of each side panel 12 and on both sides of each partition board 13 for sliding the CD-ROM racks 2. Plug holes 15 are respectively made on the side panels 12 at suitable locations below each sliding groove 14. Through holes 16 are respectively made on the partition boards 13 below each sliding groove 14. Plug pins 17 are respectively inserted in the plug holes 15 on the side panels 12 and the through holes 16 on the partition boards 13. Bearing sockets 20 are respectively made on the top and bottom panels 11;18 at the front for holding the double-swinging door 19. Each transparent door panel 191 of the double-swinging door 19 has two pivot axles 193 longitudinally aligned at one end and respectively inserted into either bearing socket 20 on the top panel 11 or the bottom panel 18, and therefore each transparent door panel 191 can be opened and closed between the top and bottom panels 11;18 at one side. Fastening elements 119 are respectively made on transparent door panels 191 for permitting the two transparent door panels 191 of the double-swinging door 19 to be fastened together in the closed position.

The CD-ROM rack 2 comprises an open frame 21 having two opposite side rails 26, parallel rods 23 spaced within the open frame 21 in the longitudinal direction, a plurality of partition plates 22 equally spaced between the two opposite side rails 26 and the rods 23 and defining a plurality of compartments 27 for keeping a respective CD-ROM 29, and two stop plates 24 transversely attached to the lower side of the front and back rails of the open frame 21. Wherein each compartment has a projecting strip 28 transversely disposed between the side rail 26 and parallel rod 23; each partition plate 22 has a top flange 25 projecting outwardly on both sides of the plate 22; the width of the compartments 27 is relatively bigger than the thickness of the CD-ROM 29 to be stored.

Figure 2:
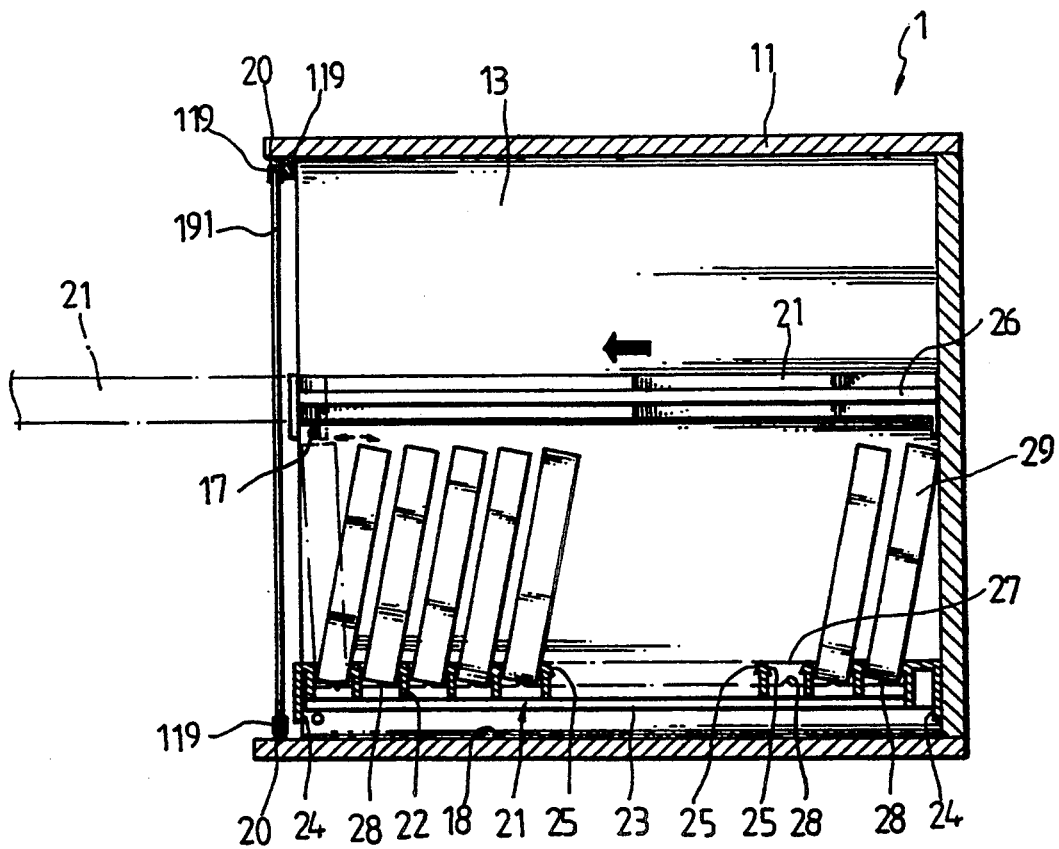
FIG. 2 is cross-sectional view showing the drawer type CD-ROM storage cabinet of FIG. 1 assembled.

Referring to FIG. 2, when the two opposite side rails 26 of the CD-ROM racks 2 are respectively inserted into the respectively sliding grooves 14 on the side panels 12 and/or the partition panels 13, the plug pins 17 are respectively inserted in the plug holes 15 on the side panels 12 and the through holes 16 on the partition boards 13 to limit the forward and backward strokes of the CD-ROM racks 2 in the cabinet body 1. Therefore, the CD-ROM racks 2 will not escape from the cabinet body 1 when they are pulled out of the cabinet body 1. When a CD-ROM is placed into either compartment 27, it becomes supported on the respective projecting strip 28 and stopped at the top flange 25 on the respective partition plate 22 at either side. When looking over a particular compact disc on the rack, the compact discs are respectively supported on the top flanges 25 of the respective partition plates 22, and therefore they will not turn over.

What is claimed is:

1. A CD-ROM storage cabinet comprising a cabinet body, which comprises a top panel, a bottom panel, two opposite side panels with plug holes on each of the two, a back panel, a double-swinging front door, at least and two vertical partition boards spaced between said side panels with through holes on each of the two, and a plurality of CD-ROM racks made to slide between said side panels and said vertical partition boards for keeping compact discs, wherein each side panel has a plurality of vertically spaced sliding grooves at an inner side for sling each CD-ROM rack and a plurality of plug pins respectively inserted in said plug holes thereof to limit the moving range of said CD-ROM racks in said cabinet body; each vertical partition board has a plurality of vertically spaced sliding grooves respectively disposed at equal elevations relative to the said sliding grooves on said side panels for sliding said CD-ROM racks, and a plurality of plug pins respectively inserted in said through holes thereof corresponding to the said plug holes on said side panels to limit the moving range of said CD-ROM racks in said cabinet body; said top and bottom panels of said cabinet body have respective bearing sockets disposed in the front to hold said double-swinging door; each CD-ROM rack comprises an open frame having two opposite side rails respectively inserted into either sliding groove on either side panel or vertical partition board of said cabinet body, parallel rods longitudinally spaced within said open frame, a plurality of equally spaced partition plates located between said side rails and said parallel rods and defining a plurality of compartments for keeping a respective CD-ROM, said compartment having a projecting strip transversely disposed between the said side rail and said parallel rod at the bottom for supporting a respective CD-ROM, each said partition plate having a top flange projecting outwardly on both sides for supporting a respective CD-ROM.

2. The CD-ROM storage cabinet of claim 1 wherein said double-swinging door is comprised of two transparent door panels having a respective top pivot and a respective bottom pivot respectively turned in a bearing socket on said top and bottom panel of said cabinet body.

3. The CD-ROM storage cabinet of claim 2 wherein said two transparent door panels of said double-swinging door have a respective fastening element, connected to each other to hold said double-swinging door in a closed position.

4. The CD-ROM storage cabinet of claim 1 and further including in combination with a CD-ROM wherein the width of each compartment of each CD-ROM rack is wider than a width of the CD-ROM.

* * * * *